United States Patent [19]

Patzner et al.

[11] 4,197,079
[45] Apr. 8, 1980

[54] PROCESS AND DEVICE FOR THE MANUFACTURE OF A TUBE BEND OF A THERMOPLAST

[75] Inventors: Alfred Patzner, Schwalbach; Josef Krüger, Kahlbach, both of Fed. Rep. of Germany

[73] Assignee: Hoechst Aktiengesellschaft, Frankfurt Am Main, Fed. Rep. of Germany

[21] Appl. No.: 951,159

[22] Filed: Oct. 13, 1978

[30] Foreign Application Priority Data
Mar. 8, 1977 [DE] Germany .................. 2709996

Related U.S. Application Data

[62] Division of Ser. No. 883,939, Mar. 6, 1978.

[51] Int. Cl.² .............................................. A01J 21/00
[52] U.S. Cl. .................................... 425/393; 425/403
[58] Field of Search .............................. 425/393, 403

[56] References Cited

U.S. PATENT DOCUMENTS

| | | | |
|---|---|---|---|
| 2,431,851 | 12/1947 | Warden | 425/403 |
| 4,080,141 | 3/1978 | Usui | 425/393 |

*Primary Examiner*—Donald J. Arnold
*Assistant Examiner*—James R. Hall
*Attorney, Agent, or Firm*—Curtis, Morris & Safford

[57] ABSTRACT

Crinkle-free tube bends can be produced by introducing a flexible core into the straight tube length to be bent, bending the tube length around movable templates at the optimum thermoforming temperature and, while bending, laying an extensible insert between the tube length and the bending template.

1 Claim, 11 Drawing Figures

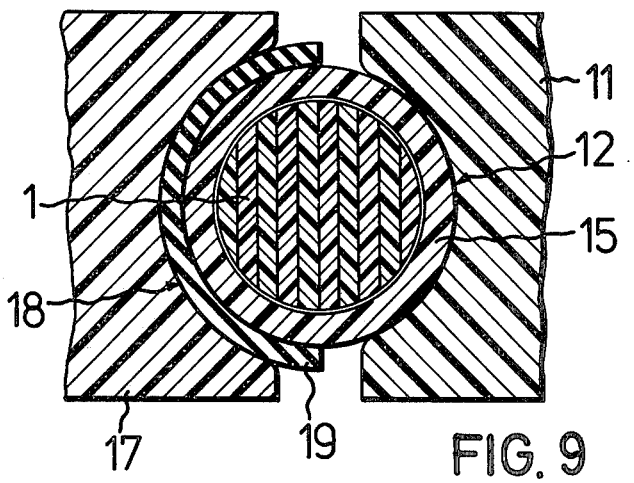
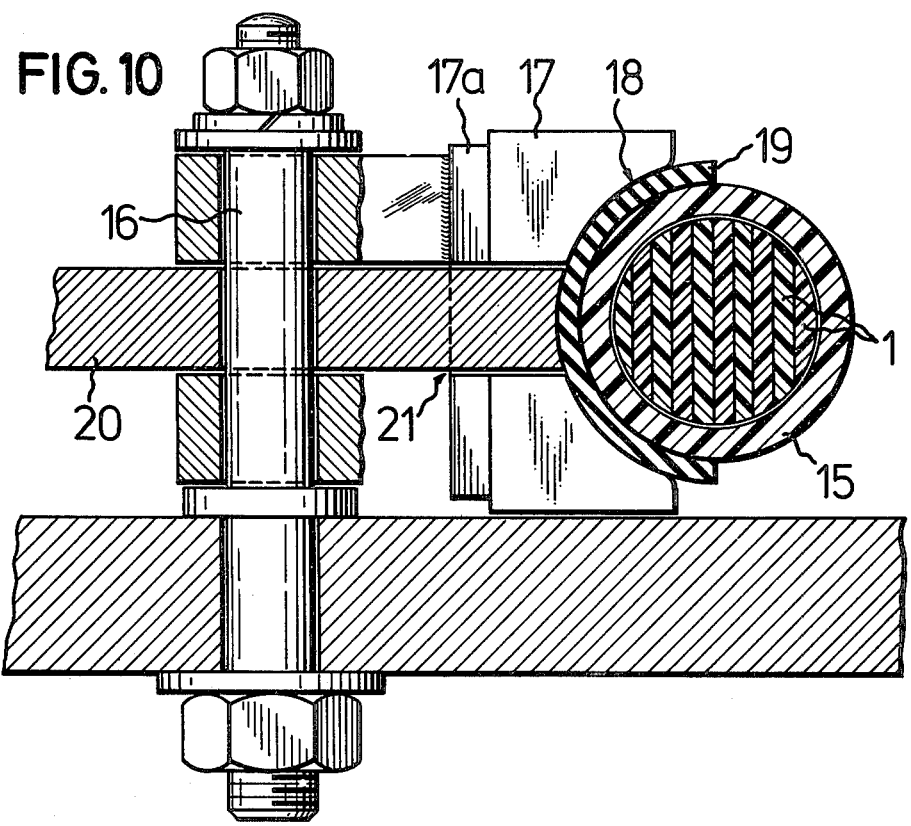

PROCESS AND DEVICE FOR THE MANUFACTURE OF A TUBE BEND OF A THERMOPLAST

This is a division of application Ser. No. 883,939, filed Mar. 6, 1978.

This invention relates to a process and device for the manufacture of a tube bend of a thermoplast.

Known processes for the manufacture of tube bends start from sheets which are shaped into shells of semicircular cross section and then welded together. In many cases the seam is considered as a disadvantage. Moreover, the process is rather complicated and takes much time.

Other processes, mainly adapted from metal working industry, yield tube bends with pleats from thermoplastic material or they are only applicable for the manufacture of tube bends having a limited range of dimensions. Processes of this kind are, for example, hot bending of tubes after filling with sand and cold bending.

It has been found, however, that with the use of sand, particles thereof adhere in the interior of the tube and have to be removed. In addition, introduction and removal of the sand are quite expensive. With cold bending, the disadvantage exists that the tube legs do not retain the expected angle with respect to each other and that, therefore, the completed pipe line is under a bending stress.

It has also been proposed to bend tubes or pipes of plastics material over an elastic bending body provided with an inserting groove for the tube. During the bending procedure an elastic counter body, preferably a coil spring, is placed in the interior of the tube (cf. Austrian Pat. No. 222,875).

It has been further proposed to bend tubes of large diameter and, above all, with thick walls over a template while filling the tube with sand and carrying a steel band along the exterior of the tube (cf. German Auslegeschrift 1,268,815).

It has also been proposed to bend pipes with the aid of an inner template and a fixed counter-template (cf. German Democratic Republic Pat. No. 57,954.

Furthermore, there has been proposed a bending process for tubes of thermoplastic material in which there is used a bending form composed of two parts and a core piece which can be moved in and out of the form and consists of flexible lamellae sliding against one another. This process is also very expensive since a special bending form is required for each diameter.

Finally, it has been proposed to heat a length of tube to a temperature within the optimum thermoforming range of the respective plastic material, to introduce into the interior of the hot tube a core consisting of lamellae capable of being shifted against one another and to bend the tube length around a bending form which represents a part of a cylinder having a radius which corresponds to the bending radius of the bend tube. It has been found, however, that tube bends free from crinkles cannot be obtained in all cases.

It has now been found that crinkle-free tube bends can be produced by introducing a flexible core into the straight tube length to be bent, bending the tube length around movable templates at the optimum thermoforming temperature and, while bending, laying an extensible insert between the tube length and the bending template.

It is, therefore, the object of the present invention to provide a process for the manufacture of a tube bend of a thermoplast by heating a straight tube length to a temperature within the optimum thermoforming range of the plastic material, introducing a supporting core into the interior of the tube and bending the tube length around a bending template, which comprises heating the tube length, introducing into the hot tube a core consisting of lamellae capable of being shifted against one another, placing an elastic, extensible insert between the tube and a circular disk the radius of which corresponds to the inner bending radius of the tube bend to be produced less the thickness of the insert and bending the tube around the circular disk, whereby the stretching insert causes an expansion of the inner surface of the tube bend.

It is another object of the invention to provide a device for the manufacture of a tube bend of a thermoplast, which comprises (a) a U-shaped frame (9) capable of being shifted to and fro in one plane, at the inner surface of the frame adapters (10) to which outer templates (11) are fitted provided, at the side turned away from the adapter, with a semicircular groove the radius of which corresponds to half the outer diameter of the tube length (15) to be bent, (b) two inner templates (17) rotating about a common axle (16) and provided, at the side facing the tube length to be bent (15), with a semicircular groove the radius of which corresponds to half the diameter of the tube to be bent (15) plus the thickness of an elastic, extensible insert (19) and (c) a circular disk (20) concentrically supported by axle (16) and having a radius corresponding to the inner bending radius of the finished tube bend less the thickness of the insert (19), which disk, in the starting position of the bending device, engages in slits (21) of the inner templates (17) in such a manner that the surfaces of the inner templates facing the tube to be bent (15) and the crown of the circular disk (20) are in straight alignment.

By optimum thermo-forming temperature there is to be understood the temperature range, which is desired in most thermo-forming processes, at which the plastics material yields to the forming forces, but still has sufficient cohesion that it does not break under these forces. With some thermoplastic materials this range is less pronounced. At a temperature above the second order transition range some plastics materials show a rubber-elastic behavior or start to flow plastically and, therefore, they cannot be subjected to a thermo-forming process of the above kind. Before insertion into the bending device, the tube lengths are heated to the optimum thermo-forming temperature by an appropriate heating device, for example a circulating air furnace, an electric heater or liquid bath. Then, a supporting core is inserted into the tube.

The present invention will now be described in greater detail by way of example only with reference to the accompanying drawings in which FIG. 1 is a longitudinal section of a first form of a supporting core for use in the process;

FIG. 9 is a cross-section along line IX—IX of FIG. 8;

FIG. 10 is a cross-section along line X—X of FIG. 7; and

Figure 1:
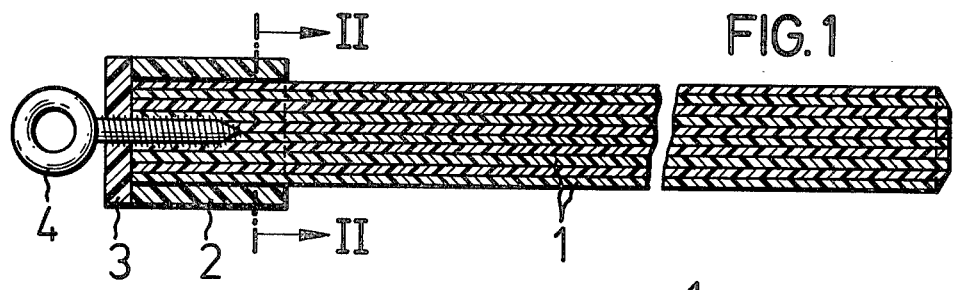
Figures 2, 3:
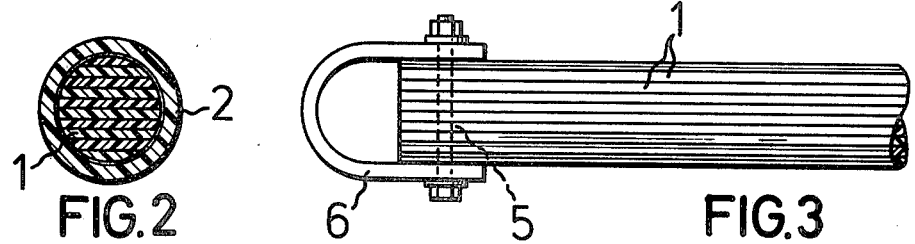
FIG. 2 is a cross-section along line II—II of FIG. 1.
FIG. 3 is a side view of a second form of a supporting core.

Referring first to FIGS. 1 and 2 of the drawings, the supporting core consist of a plurality of lamellae (1) which can slide against one another and which are connected together at one end, preferably by a short length of pipe (2) and a plate (3), which serves also as a stopper during insertion of the core into the length of tube to be bent. In addition, it is preferable to provide the core at this end with a device facilitating extraction of the core from the bent tube, for example an eye (4).

FIG. 3 shows another method of connecting the individual lamellae, i.e. by a pin (5) and a shackle (6). The lamellae (1) may consist of thin metal strips or alternate metal and plastic strips. It is preferred to manufacture the whole supporting core from plastic material, especially from a polyolefin. The thickness of the individual lamellae may be from 0.5 to 10 mm. With small nominal widths and small bending radii, thin lamellae are preferred. For the manufacture of tube bends with small bending radii, it is advantageous to replace the lamellae by flexible rods.

Figure 4:
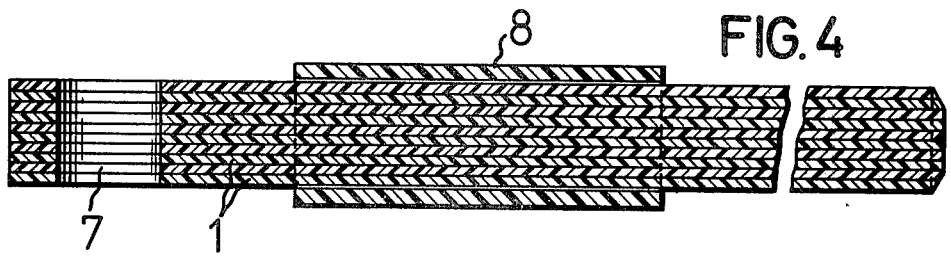
FIG. 4 is a longitudinal section of a third form of a supporting core.
Figure 5:
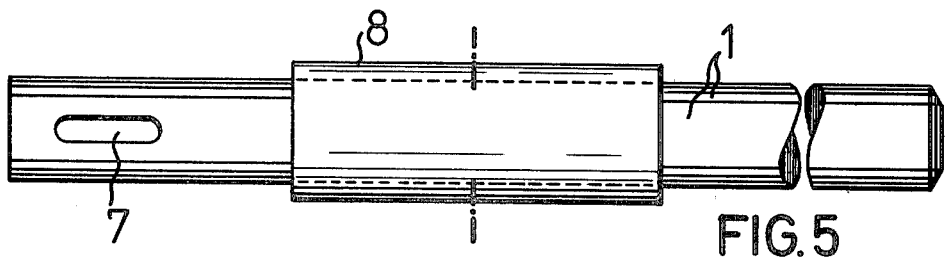
FIG. 5 is a top view of the supporting core of FIG. 4.
Figure 6:
FIG. 6 is a cross-section of the core of FIGS. 4 and 5.

The supporting core shown in FIGS. 4, 5 and 6 also consists of lamellae (1) which are loosely placed one on top of the other. To facilitate handling, the lamellae can be held together by suitable means, for example a length of tube (8) which is pushed over and movable along the lamellae. Other means are likewise possible and feasible. In order to remove the core more easily from the tube bend, the lamellae are provided adjacent one end with a slot (7) into which a hook or similar device can be inserted. The size of this slot and its distance from the end of the lamellae depend on the nature of the material of the lamellae and its strength. In metal lamellae the hole may be larger and closer to the end of the lamellae, whereas with plastic lamellae it must be smaller and farther from the end of the lamellae.

Figure 7:
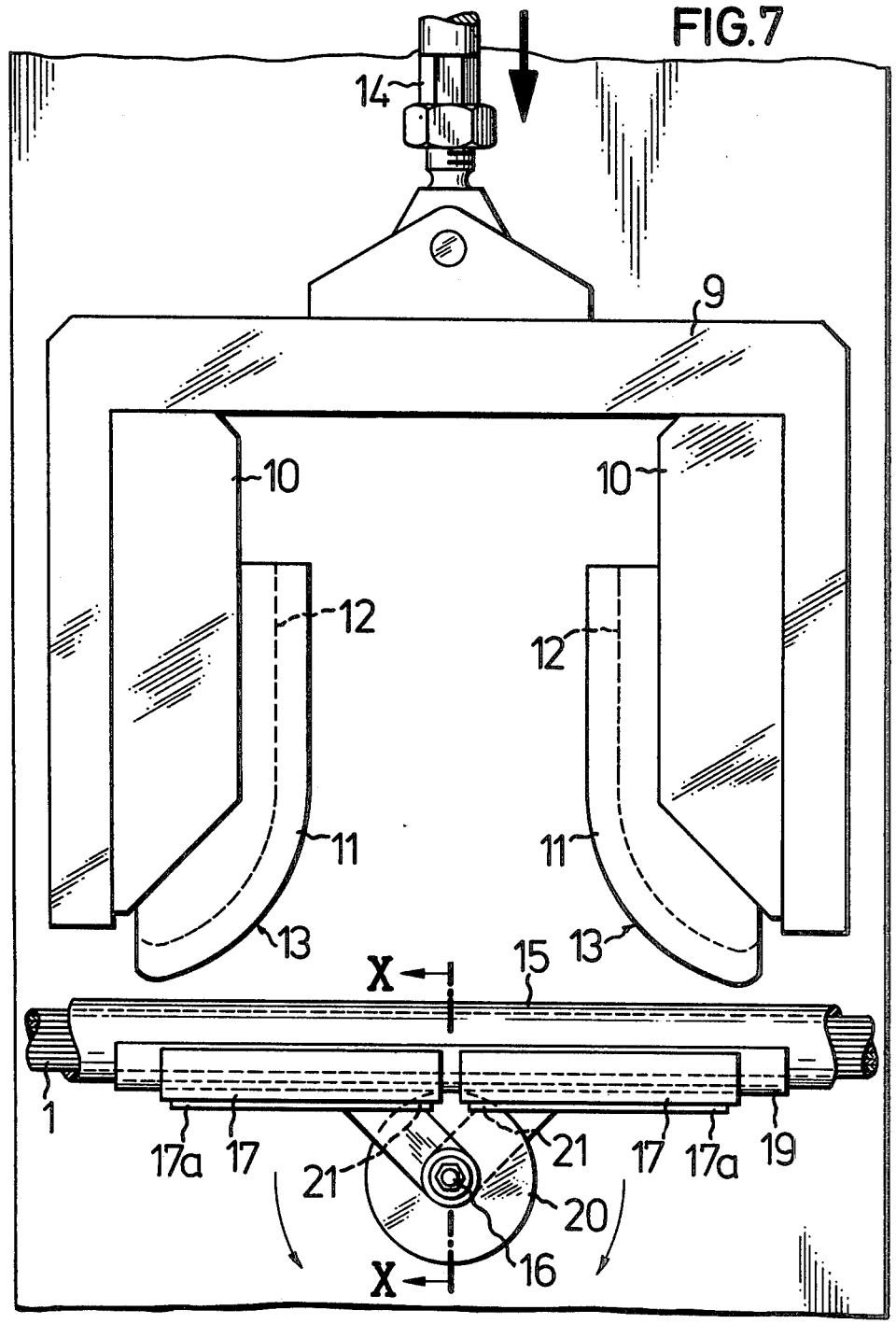
FIG. 7 is a top view of a device in starting position.
Figure 8:
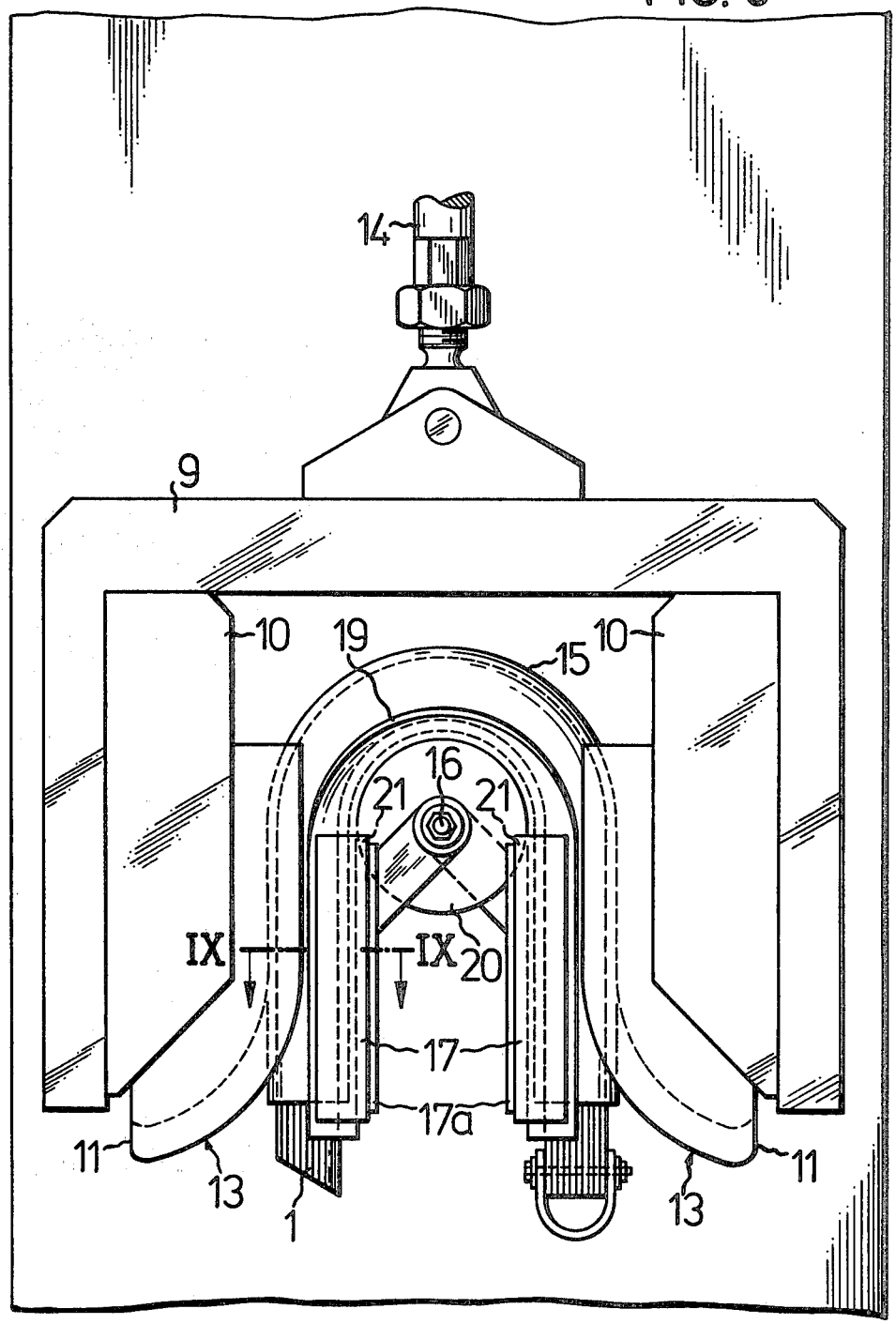
FIG. 8 is a top view of the device shown in FIG. 7 with the bent tube.

Referring now to FIGS. 7 and 8 of the drawings, the device to be used according to the invention consists of a frame (9) capable of being shifted to and fro in one plane and forming a U with two equal legs, the open side of which faces the tube length (15) to be bent. Exchangeable outer templates (11) are fitted on the inner side of frame (9) by means of adapters (10) which can be likewise exchanged to adapt the device to different tube diameters and bending angles. Adapters (10) and outer templates (11) are preferably fitted on the opposite legs of the U-shaped frame (9) and hence, they are preferably arranged in pairs. It is likewise possible, however, especially for bending tubes of small diameter, to make the adapters and outer templates of one piece each. In this case the outer template has the shape of a U with diverging legs.

As shown in FIG. 9 of the drawings, the surfaces of the outer templates facing the tube length (15) and turned away from adapters (10) are provided with semicircular grooves the radius of which corresponds to half the outer diameter of the tube (15). Moreover, each front end of the outer templates is provided with a curvature (13) along which the tube length can slide during the bending process.

The device of the invention is moved to and fro in suitable manner, for example by means of a connecting rod (14), mechanically, pneumatically or hydraulically.

The counter-support for the tube length (15) to be bent consists of two inner templates (17) rotating around a common axle (16). As shown in FIGS. 9 and 10, the surfaces of the inner templates facing the tube length to be bent are provided with semicircular grooves (18) the radius of which corresponds to half the diameter of the tube (15) to be bent inclusive of the thickness of the elastic, extensible insert (19). Between the two inner templates (17), in concentric position with respect to the rotating axle (16) a circular disk (20) is provided for, the radius of which corresponds to the inner bending radius of the finished tube bend less the thickness of the insert (19). The curvature of the peripheral surface of the circular disk (20) need not correspond to the curvature of the semicircular groove in the inner template. The peripheral surface may be cylindrical if the thickness of the circular disk does not exceed one third of the diameter of the tube length (15).

The circular disk (20) engages in slits in the inner templates (17). In the starting position of the bending device according to FIG. 7, the surface of the inner templates facing the tube length (15) to be bent is in alignment with the summit of the circular disk (20). In the bending position as shown in FIG. 8, the inner templates (17) have been disengaged from the circular disk (20) to a greater or lesser extent, depending on the bending angle. To improve the stability of the inner templates (17), they are mounted on metal supports (17a).

In order that the tube length (15) is a little extended on the inner side in the bending zone, whereby the formation of crinkles in this area is avoided, the inner templates should not be shifted too easily from the starting position. Their movement is, therefore, hindered in suitable manner, for example by mechanic, pneumatic or hydraulic means. The movement of the inner templates can be independent of that of the outer templates, but it may also coupled therewith, for example mechanically by a lever mechanism or a gearing, a common pneumatic or hydraulic system. In the most simple case, the movement of the inner templates (17) is hindered by screw bolts which are guided in arc-shaped slots and the nuts of which are set to a definite torque. Alternatively, the friction of the aforesaid screw bolts in the slots can be produced by springs which can be rapidly loosened with the aid of an excentric lever for bringing back the inner templates (17) into the starting position.

Inner templates (17) and circular disk (20) can also be exchanged for adaptation to different tube diameters. The bending device shown in FIGS. 7 and 8 partly consists of high density polyethylene. The adapters (10), the outer templates (11), the inner templates (17) and the circular disk (20) are made of high density polyethylene, while the frame (9) is preferably made of a U-shaped metal profile. It is likewise possible, of course, to make the above parts from wood. The elastic, extensible insert consists of natural or synthetic rubber or a like material. The insert has a thickness of 5 to 30 mm, preferably 8 to 25 mm, it is about one and a half time as large as the diameter of the tube length to be bent and two and a half times as long as the total length of the two inner templates (17).

As can be seen on FIG. (7), the hot length of tube (15) containing the core (1) is placed in the bending device (17) in such a manner that it is lying on the inner templates (17) with interposition of the insert (19). The frame (9) with the outer templates (11) is then shifted towards the tube length, simultaneously the inner templates (17) fold back so that the tube is bent around the circular disk (20). During this procedure the tube expands along the inner surface of the arc and no pleats are formed.

Figure 11:
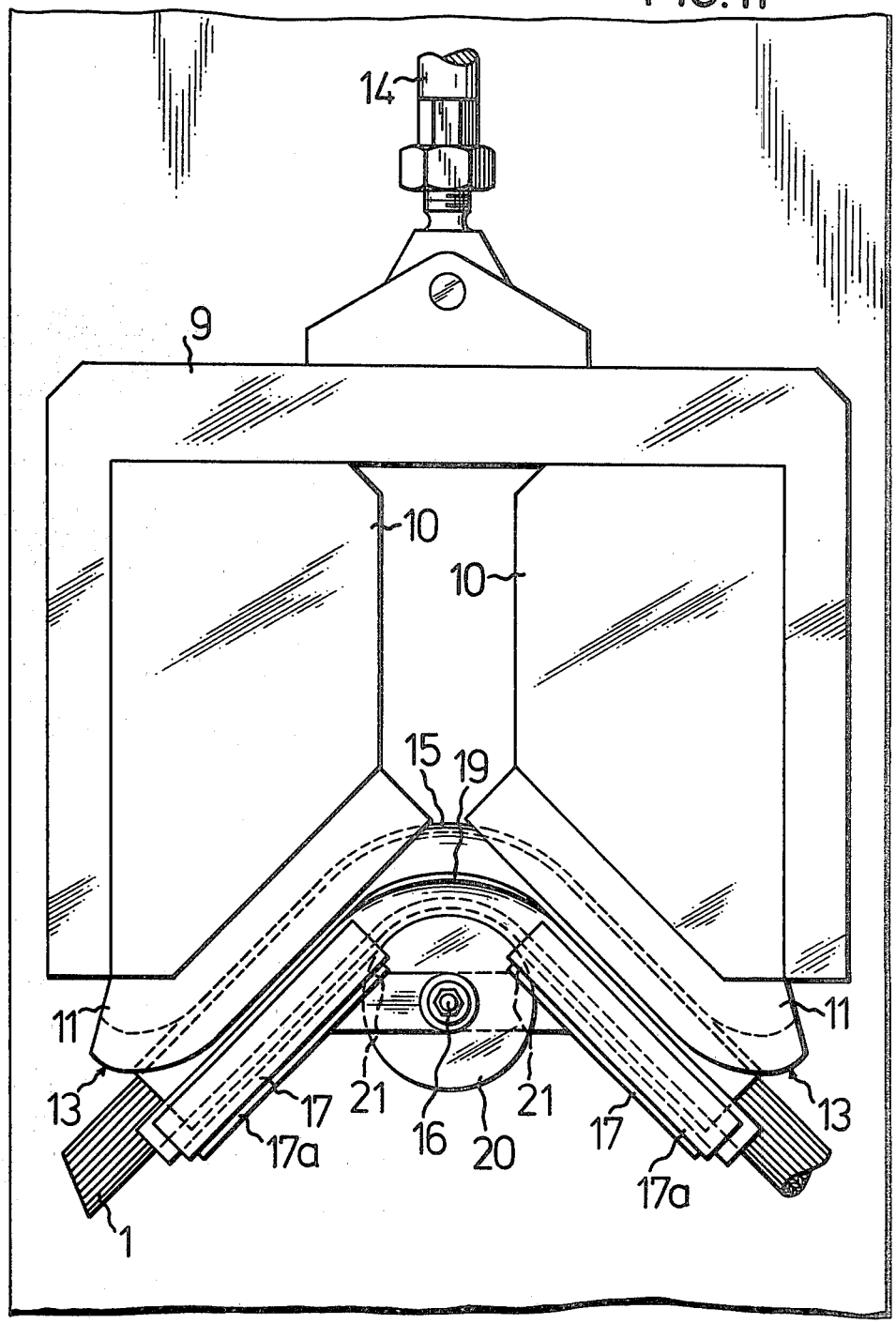
FIG. 11 is a top view of a second form of a device according to the invention.

FIG. 8 shows the device after the manufacture of a U-shaped bend. In this case, the inner templates (17) are in parallel position opposite each other and the inner radius of the tube bend is equal to the radius of the disk (20) plus the thickness of the insert (19). Although in the present case the bending of a U-shaped tube has been described, the device according to the invention can likewise serve to manufacture tube bends with smaller bending angles. To this end, it is only necessary to exchange the adapters (10) as shown in FIG. 11 illustrating the manufacture of a right-angled tube bend.

After cooling of the tube bend in the bending device, it is removed and the core is withdrawn. The tube bend can be directly used without after-treatment. It is characterized by smooth inner and outer surfaces. In the bending zone the diminution of the wall thickness amounts to less than 10%.

The process and device of the invention are especially suitable for the manufacture of tube bends of polyvinyl chloride, polyethylene and polypropylene, very good results being obtained with high density polyethylene and polypropylene.

What is claimed is:
1. Device for making a tube bend in a thermoplast tube material, which comprises
   (a) a U-shaped frame capable of being shifted to and fro in one plane, at an inner surface of frame adapters, to which outer templates are fitted, provided at a side turned away from said adapter, with a semicircular groove the radius of which corresponds to half the outer diameter of a tube length to be bent,
   (b) two inner templates rotating about a common axle and provided, at a side facing the tube length to be bent, with a semicircular groove the radius of which corresponds to half the diameter of the tube to be bent plus the thickness of an elastic, extensible insert and
   (c) a circular disk, concentrically supported by an axle and having a radius corresponding to the inner bending radius of a finished tube bend, less the thickness of the insert, which disk, in a starting position of said device for tube bend, engages in slits for the inner templates, in such a manner, that the surfaces of the inner templates facing the tube to be bent and a crown of said circular disk are in straight alignment.

* * * * *